United States Patent
Hable et al.

(10) Patent No.: US 6,205,000 B1
(45) Date of Patent: Mar. 20, 2001

(54) COMPOSITE DATA CARTRIDGE DRIVE BELT

(75) Inventors: Mary R. Hable, Stillwater; Kam W. Law, Woodbury; Christopher J. Zwettler, Maplewood; R. Galen McCrea, Jr., Stillwater, all of MN (US); David P. Smith, Hudson, WI (US); Jeffrey W. McCutcheon, Eagan, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 08/346,635

(22) Filed: Nov. 30, 1994

(51) Int. Cl.[7] .................................................. G11B 23/02
(52) U.S. Cl. .......................................... 360/132; 242/342
(58) Field of Search ............................ 360/132; 242/342, 242/352.4, 332.6; 106/36; 474/237, 167, 264, 273

(56) References Cited

U.S. PATENT DOCUMENTS

| 3,305,186 | 2/1967 | Burdorf et al. | 242/55.12 |
|---|---|---|---|
| 3,692,255 | 9/1972 | Von Behren | 242/192 |
| 4,342,809 | 8/1982 | Newell | 428/215 |
| 4,396,465 | * 8/1983 | Newell | 204/9 |
| 4,688,742 | 8/1987 | Hettich | 242/192 |
| 4,752,282 | 6/1988 | Habegger | 474/263 |
| 5,019,018 | 5/1991 | Georget | 474/117 |
| 5,057,177 | * 10/1991 | Balloni et al. | 156/244.11 |
| 5,131,891 | 7/1992 | Eggebeen et al. | 474/237 |
| 5,199,660 | 4/1993 | Smith | 242/192 |
| 5,203,519 | 4/1993 | Rotter | 242/192 |

FOREIGN PATENT DOCUMENTS

| 0 579 116 A2 | 7/1993 | (EP) . |
|---|---|---|
| 1-237983 | 9/1989 | (JP) . |
| 4-163776 | 6/1992 | (JP) . |
| WO 93/24928 | 12/1993 | (WO) . |

OTHER PUBLICATIONS

"Torsional Vibration Analysis of Belt–Driven Camshafts in a High Speed IC Engine" By B.E. Mitchell—GM/Powertrain, J.W. David—North Carolina State Univ., and J.A. Covey—GM/Motorsports Tech. Group.; No. 942503, pp. 111–118.

"Belt Vibration Consideration Moving Contact and Parametric Excitation" By. M.G. Yue, DE–vol. 43–1, International Power Transmission and Gearing Conference—vol. 1, ASME 1992, pp. 311–318.

* cited by examiner

Primary Examiner—Sara Crane

(57) ABSTRACT

The data cartridge drive belt of this invention comprises a layer of a low stiffness belt material and a layer of a high stiffness belt material. By inserting the belt into the tape cartridge so that the high stiffness belt material is adjacent to the tape pack and the low stiffness material is away from the tape pack the neutral axis in the belt is shifted toward the tape pack.

2 Claims, 1 Drawing Sheet

US 6,205,000 B1

COMPOSITE DATA CARTRIDGE DRIVE BELT

BACKGROUND OF THE INVENTION

1. Technical Field

The present invention concerns a tape cartridge in which a flexible, elastic drive belt contacts the tape which is wound on tape spools and movement of the belt causes movement of the tape between the spools.

2. Background Information

Belt driven tape cartridges are frequently used to interface with computers where high tape speeds and rapid acceleration and deceleration of the tape are required. U.S. Pat. No. 3,692,255, incorporated herein by reference, discloses such a patent in which the magnetic recording tape is wound on two tape spools by an endless flexible belt in frictional contact with the magnetic tape on both spools. The endless flexible belt is wrapped around and driven by a capstan within the cartridge. The capstan itself is driven by a motor drive roller or drive puck which is external to the cartridge and is a portion of a recording/playback tape recorder mechanism into which the cartridge is inserted.

Tension in the tape is created by a difference in belt tension at each tape pack periphery caused by the controlled drag in the corner rollers. This tension difference causes the tape to wind from one spool to another as well as creating the desired value of tension at the read/write head. A minimum tape tension is necessary for reliable reading and recording of information. However, if the tape tension is too high undue wear occurs at the tape/head interface.

Because the belt has finite thickness, the centerline of the belt is moving at a slightly different speed than the tape pack peripheries. This causes the tape tension to increase as the tape winds from one tape hub to the other. If tape tension is profiled for running the tape cartridge in both the forward and reverse directions a bow-tie appears. This variation in tape tension results in a variation in the drive force required to propel the tape and a higher maximum drive force required at the end of the tape pack. A tape tension profile that is as flat as possible is desirable to limit the variation in drive force, reduce the maximum drive force required, and improve the performance of the cartridge over a variety of temperatures and after aging and use. The latter occurs because a flat tape tension profile allows for variation with temperature, age, and use without moving the cartridge out of the reasonable process window.

In addition to the overall variations in tape tension and drive force as the tape winds from one spool to another, small variations in tape tension may occur with a relatively high frequency during the process of running the tape cartridge. These small variations are called dynamic tape tension and result from small longitudinal movements of the tape caused by imperfections in the rotating components. High dynamic tape tension is undesirable because they may interfere with data reading or writing.

Conventional one layer belts that are more elastic show reduced bow-tie when compared to stiffer belts. Unfortunately, such elastic belts may also increase dynamic tape tension depending on the frequency of the rotating component imperfections.

SUMMARY OF THE INVENTION

The present invention provides a belt for a belt driven magnetic tape cartridge which reduces end to end variation in tape tension, i.e. bow-tie, without an undue increase in dynamic tape tension. This is achieved by moving the neutral axis of stress in the belt toward the tape pack as the belt is contacted with the tape pack in an arc.

DETAILED DESCRIPTION OF THE INVENTION

Figure 1:
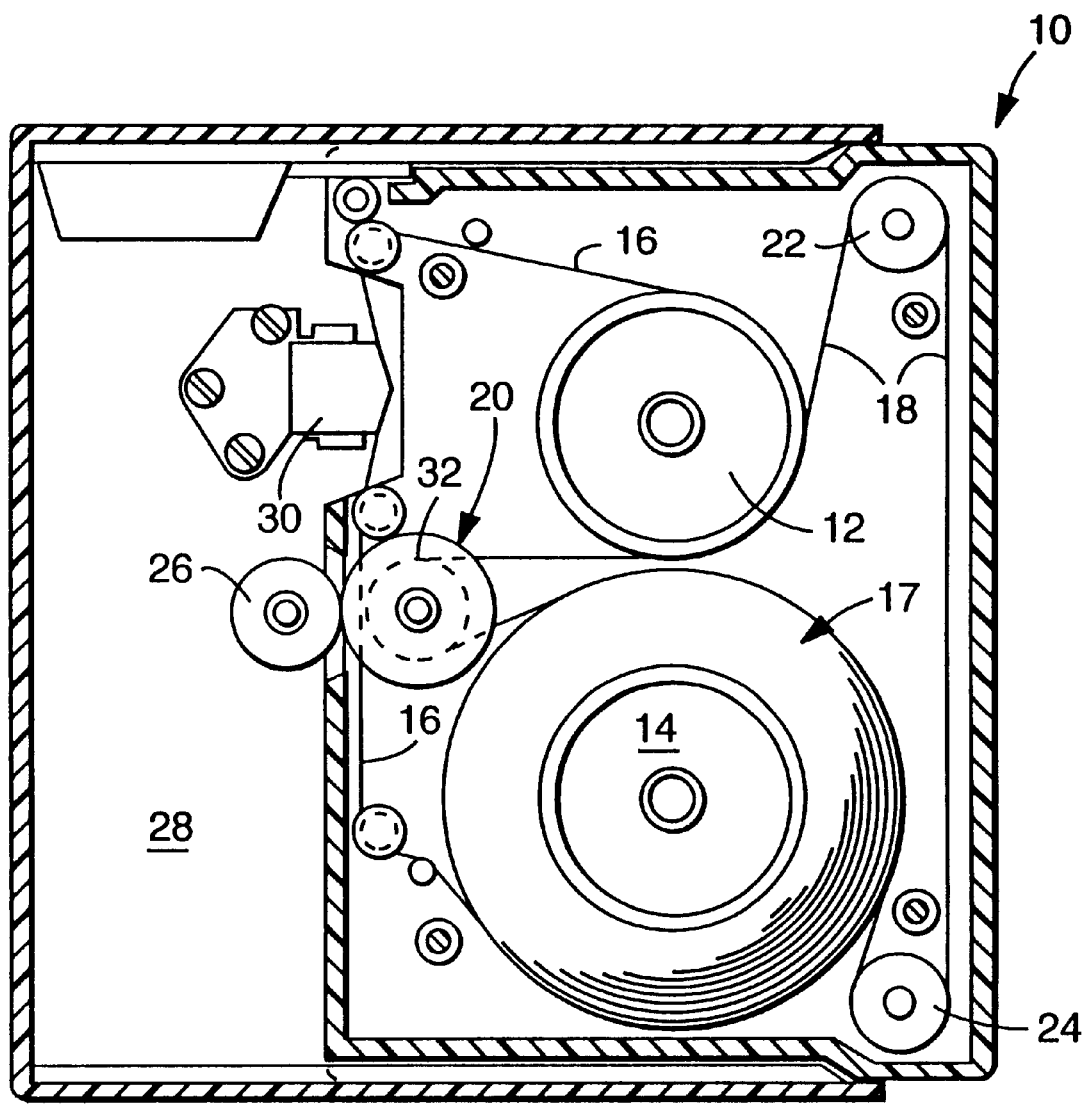
FIG. 1 is a schematic representation of a belt-driven data cartridge.

Referring to FIG. 1, a cartridge 10 is shown in a tape deck 28. Cartridge 10 has a pair of hubs 12 and 14 on which is wound a length of magnetic recording tape 16. A drive belt 18 is entrained or wound around a belt drive roller 20, a pair of belt guide rollers 22 and 24, and one or two tape packs 17 formed by the portion of tape 16 wound around hubs 12 and 14. When cartridge 10 is moved into operative position in tape deck 28 as shown in FIG. 1, drive puck 26 of tape deck 28 contacts belt drive roller 20, and the magnetic recording head 30 of deck 28 contacts tape 16. The belt-contacting portion 32 of belt drive roller 20 is recessed to permit tape 16 to pass without touching roller 20.

Stiffness of belt material may be defined in various ways including compliance, which is also known as k-factor. For purposes of this application the k-factor is measured only after the belt has been stretched to the length it would be in the tape cartridge. It is important to perform this step preliminary to testing for two reasons. First, the k-factor is not necessarily a linear function of strain and the belt material may have a different k-factor at its working length and tension than in its original unstretched state. Moreover, the material may have a different k-factor the first time it is stretched than is obtained on subsequent stretching and testing. After the belt is stretched to its working tension or length, the belt is stretched an additional incremental amount and the incremental increase in tension is measured. The k-factor is equal to the change in length of the belt divided by the initial stretched length of the belt and the change in tension or $$k = \Delta L/(L_o \times \Delta T)$$

where k=k-factor, $\Delta L$=incremental increase in length during testing, $L_o$=length of belt in cartridge, and $\Delta T$=incremental increase in tension during testing. The k-factor is equal to the inverse of the modulus of elasticity at the operating conditions, E, times the cross-sectional area of the belt or k=1/(E×cross-sectional area). For purposes of this application the k-factor was measured at a strain rate of 0.0036 sec$^{-1}$.

The composite belt of this invention has a k-factor in the range of 0.01 to 0.25 N$^{-1}$, preferably 0.01 to 0.1 N$^{-1}$. The belt working thickness is in the range of 0.05 to 0.127 mm with a working width of about 2–6 mm. Working thickness and width refer to the thickness and width when the belt is inserted in a tape cartridge. The ratio of the thickness of the high stiffness material to the thickness of the low stiffness material is preferably less than 1:1, more preferably less than 1:2, and most preferably less than 1:3. However, the layer of the high stiffness material has a minimum thickness of about 1.3 μm, preferably at least 1.5 μm, more preferably at least 5 μm.

The layer of the high stiffness material is adjacent to the tape pack peripheries when the belt is inserted in the tape cartridge. The layer of low stiffness material is further away from the tape pack peripheries than is the high stiffness material when the belt is inserted in the tape cartridge. If the belt is inserted in the opposite manner, the benefits of having a stiffer layer and a less stiff layer are not realized. According to one embodiment, the high and low stiffness materials may be defined in terms of the k-factor of a single layer belt having only that material and having a cross section of about 0.19 mm². Such a belt made of the high stiffness material alone would preferably have a k-factor of no more than about 0.02 N$^{-1}$. A similar belt made of a low stiffness material alone would preferably have a k-factor of no less than 0.02 N$^{-1}$.

The modulus of elasticity of the high stiffness material divided by the modulus of elasticity of the low stiffness material is greater than 1, preferably greater than 1.2, more preferably in the range of 1.4–10, and most preferably in the range from 1.5 to 5.

It is desirable that the neutral axis of stress as the belt contacts the tape pack in an arc be located as close as possible to the interface of the layer of the high stiffness material and the layer of the low stiffness material.

The material for both layers of the belt may be polymers with elastic characteristics. Non-limiting examples of such materials include polyurethanes, copolyester ethers, styrene-diene block copolymers, polyethers, polyacrylates, fluorocarbons, fluorosilicones, fluoroalkoxyphosphazenes, silicones, ethylene-acrylic copolymers, butadiene-acrylonitrile copolymers, natural rubber, styrene butadiene copolymers, polyisoprene, polybutadiene, polychloroprene, isobutylene-propylene-diene terpolymers, polyepichlorohydrin, chlorosulfonated polyethylene, chlorinated polyethylene, polypropylene oxide, and polypentenamers. The polyurethanes, such as polyether urethanes and polyester urethanes, are preferred, and polyester urethanes are particularly preferred.

Preferably, the low stiffness materials are polymers having glass transition temperatures ($T_g$) of less than −25° C. as indicated by the tan delta peak at 1 Hz by Dynamic Mechanical Spectroscopy (DMS). The high stiffness materials are preferably polymers having Tg as indicated by the tan delta peak at 1 Hz by DMS in the range of −25 to 50° C., preferably 0 to 50° C.

To further reduce the dynamic tape tension variations, a damping material may optionally be used between the low stiffness layer and the high stiffness layer. Suitable damping materials preferably have $T_g$ between 0 and 50° C. at frequency of 0 to 500 Hz. Some damping materials include asphaltics, polyurethanes, poly(vinyl acetate) and copolymers thereof, acrylics, natural rubber, styrene-butadiene, and silicones. The thickness of the damping layer is preferably from 12 to 100 μm, more preferably 12 to 50 μm. Coatings may also be applied to the belt as is known in the art to provide desired antistatic and durability characteristics.

The composite belt may be manufactured by laminating, by coextruding the high stiffness material and the low stiffness material, or by extrusion coating. A concentric ring is punched out of a sheet of the laminated or coextruded material. This concentric ring is then stretched for insertion into the data cartridge.

According to a preferred method the belts of this invention are manufactured according to the following process:

1. The high and low stiffness materials are coextruded onto a textured polypropylene sheet. The polypropylene sheet provides texture to one side of the belt while a release coated, textured nip roll provides texture to the other side of the sheet. It is important for the performance of the cartridge to maintain a uniform belt thickness and relatively uniform thickness of each layer.

2. Rings are cut or punched from the coated sheet. The polypropylene sheet provides important protection to the belt during this manufacturing process since it is important to avoid contamination to the belt which could later be transferred to the tape surface. Low kilowatt levels of high electrical voltage corona treatment of the polypropylene may optionally be used to provide an increase in adhesion of the polypropylene to the belt material to prevent premature removal of the polypropylene while still allowing the polypropylene to be easily peeled off at the desired time.

3. After removing the polypropylene sheet. The rings are heated to partly anneal or stress relax the polymer.

4. The rings are then stretched while being heat treated or annealed. Typically, the belts are stretched 200 to 500%. This hot stretching can be carried out by stretching the belt between two rolling rollers to the desired tension or elongation and moving it past a heat source such as an infrared lamp. The hot stretching process causes the tension in the belt to decrease. The process may be stopped when the tension reaches a desired level.

5. The annealed belts are then installed on tape cartridges. Further details may be found in European Patent Publication 579 116 A2.

This invention is further described in the following example.

EXAMPLE 1

Belts were made according to the above procedure. These belts were tested for k-factor according to the method described above. The belts were inserted into cartridges and tape tension variation from the beginning to the end of the tape (bow-tie) and dynamic tape tension were measured. Bowtie is determined by subtracting tape tension measurements at the end of tape (EOT) from those made at the beginning of the tape (BOT). When tape tension is measured, data over one inch spans is used to determine "local" averages, maximums, and minimums. Tape tension at EOT and BOT is determined by averaging the local averages computed over the first (BOT) or last (EOT) 36 inches (91 cm). The glass transition temperature of each material was also determined as the tan delta peak by dynamic mechanical spectroscopy (DMS) at 1 Hz. Each sample belt had a stretched width of 2.54 mm. As inserted in the tape cartridge, Layer 1 is the layer closest to the tape pack and Layer 2 is further away from the tape pack. For the inventive belts, Samples 2–6, Layer 1 is stiffer than Layer 2. Comparative Sample 1 has only one layer. While Comparative Sample 7 is a two layer belt inserted backwards so that the high stiffness layer is further from the tape pack and the low stiffness layer is closer to the tape pack. The results shown in the Table indicate that the belts of this invention have better bow-tie, i.e. lower end to end variation in tape tension than do non-inventive belts.

| Sample | Layer 1 | Layer 2 | Stretched Thickness (mm) | Thickness ratio layer 1:layer 2 | Bowtie (N)* | k-factor (1/N) | Layer 1 Tg (° C.) | Layer 2 Tg (° C.) | Dynamic tape tension at 20° C. (N) |
|---|---|---|---|---|---|---|---|---|---|
| Comp. 1 | Estane 58277* | — | 76 | — | 0.26 | 0.016 | −8.9 | — | — |
| 2 | Estane 58277 | Estane 58206 | 89 | 2:5 | 0.16 | 0.022 | 1 | −34 | — |
| 3 | Estane 58277 | Estane 58300 | 89 | 2:5 | 0.11 | 0.030 | −7 | −49 | — |
| 4 | Estane 58277 | Estane 58300 | 89 | 2:5 | 0.11 | 0.030 | −7 | −49 | 0.061 |
| 5 | Estane 5788p | Estane 58300 | 89 | 2:5 | 0.083 | 0.040 | 8 | −44 | 0.039 |
| 6 | Estane 58277 | Estane 58300 | 89 | 2:5 | 0.12 | 0.030 | −7 | −49 | — |
| Comp. 7 | Estane 58300 | Estane 58277 | 89 | 5:2 | 0.34 | 0.030 | −49 | −7 | — |

*Samples 1–3 and 6–7 were measured at 22° C. Samples 4 and 5 were measured at 20° C.
Estane 58277 is a polyester urethane from B.F. Goodrich.
Estane 58206 is a polyester urethane from B.F. Goodrich.
Estane 58300 is a polyether urethane from B.F. Goodrich.
Estane 5788p is a polycarbonate urethane from B.F. Goodrich.

What is claimed is:

1. A belt driven tape cartridge comprising:

a belt drive roller;

a pair of belt guide rollers;

a pair of hubs on which is wound a length of magnetic tape, thereby forming a tape pack; and a drive belt having a thickness in the range from 50 to 130 µm entrained around the drive roller, the pair of guide rollers, and the tape pack, whereby rotation of the drive roller causes the drive belt to transfer the magnetic tape from one hub to the other, wherein the drive belt comprises a layer of a high stiffness material adjacent to the tape pack and a layer of a low stiffness material further away from the tape pack, wherein a ratio of the thickness of the layer of high stiffness material to the thickness of the low stiffness material is less than 1:1, and the layer of the high stiffness material is at least 1.3 µm thick.

2. The cartridge of claim 1 wherein the ratio of the thickness of the layer of high stiffness material to the thickness of the low stiffness material is less than 1:2.

* * * * *